Oct. 21, 1924.
H. R. TRAPHAGEN
1,512,510
TRACTOR STEERING MECHANISM
Filed Dec. 8, 1920 4 Sheets-Sheet 3
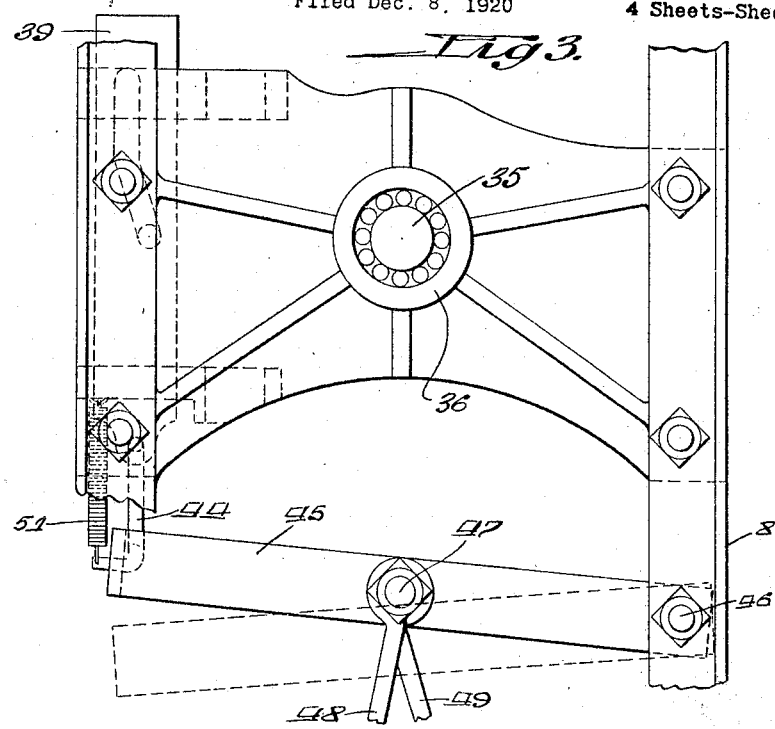
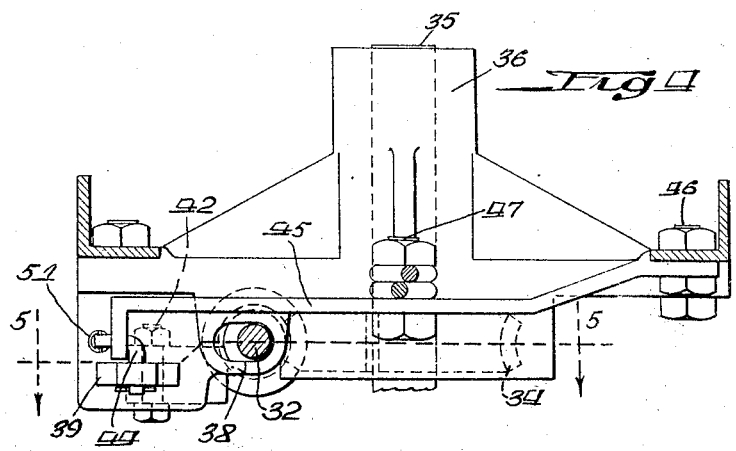
Inventor
Henry R. Traphagen
By. Ira J Wilson
Atty.

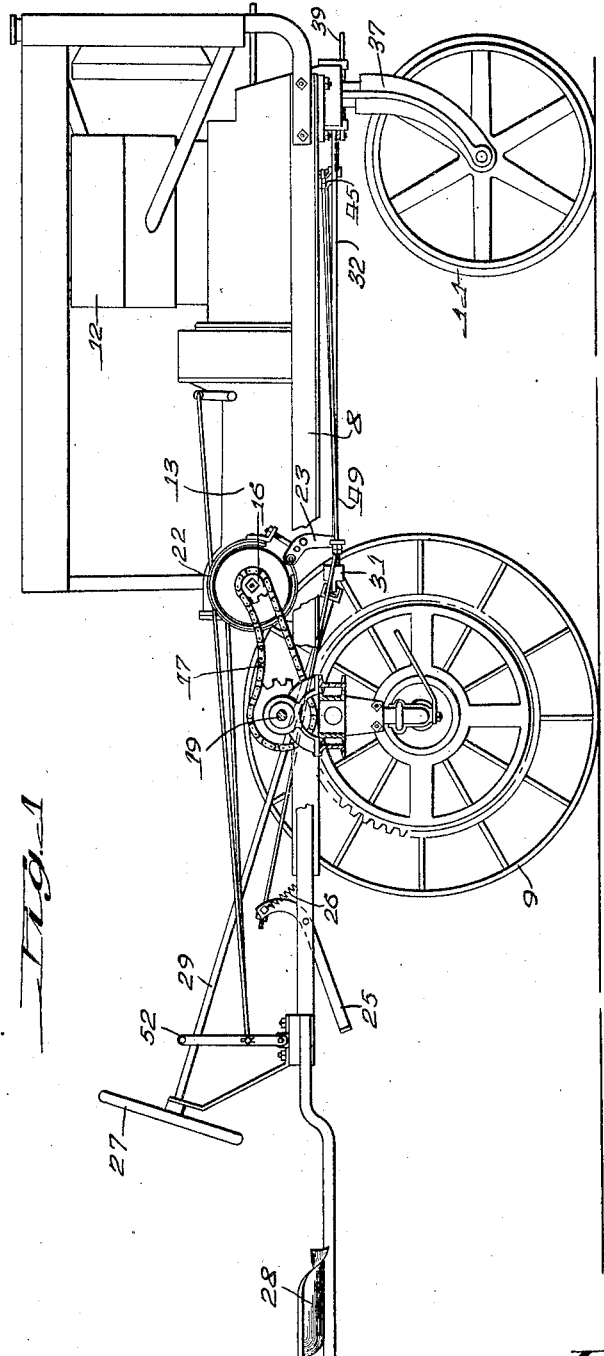

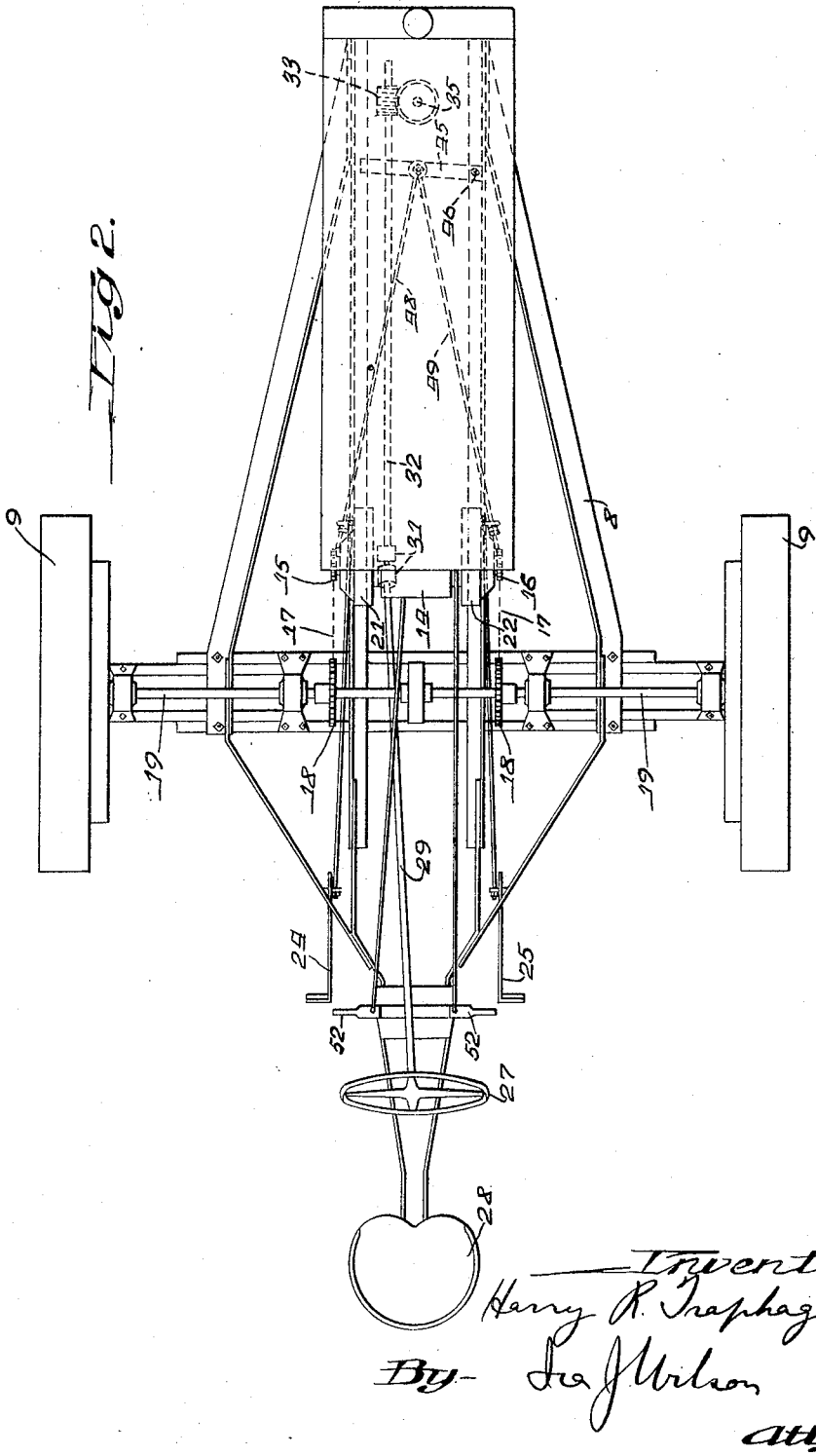

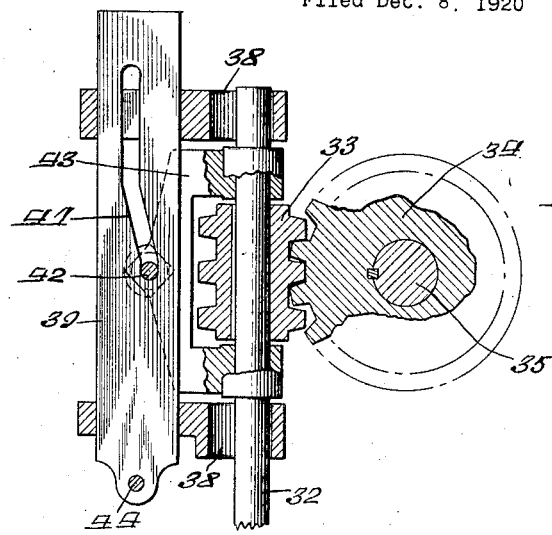
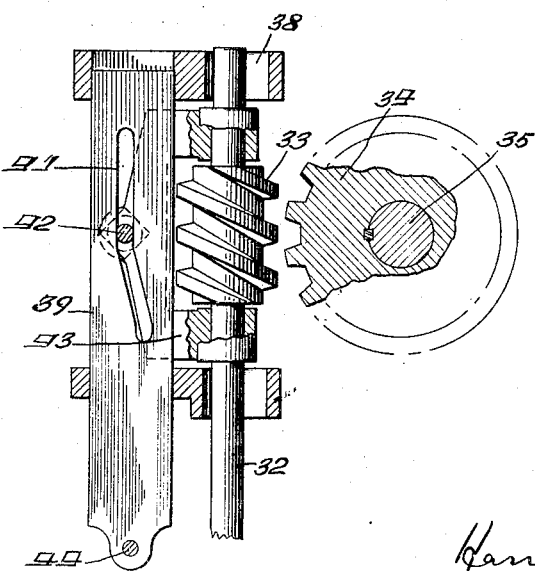

Patented Oct. 21, 1924.

1,512,510

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

TRACTOR STEERING MECHANISM.

Application filed December 8, 1920. Serial No. 429,181.

*To all whom it may concern:*

Be it known that I, HARRY R. TRAPHAGEN, a citizen of the United States, residing at Rockford, in the county of Winnebago and State of Illinois, have invented certain new and useful Improvements in Tractor Steering Mechanism, of which the following is a specification.

This invention pertaining in general to motor vehicles, has reference to steering mechanism therefor, and more particularly to steering by driving, that is, by the traction wheels, whereby one is caused to revolve faster than the other to turn the vehicle.

This method of steering by driving is frequently used in farm tractors. It is especially adapted to those tractors or other motor vehicles employing in connection with the traction wheels, one or more pivot steering wheels, which serve effectually for straight-away steering but will not turn the vehicle in as short a radius as is possible by means of differential drive of the traction wheels. Heretofore such pivot wheel or wheels have been positively connected to a hand steering wheel located at the driver's seat. When the traction wheels are operated for turning, it becomes necessary for the pivot wheel or wheels to caster, and if the driver does not instantly remove his hands from the steering wheel he is apt to be injured by reason of the fast rotation imparted to the wheel by the quick castering.

This objection I have entirely overcome in the present invention, which aims primarily to provide for releasing the pivot steering wheel from its hand control device when the traction wheels are employed for turning the vehicle. In other words, I have provided a novel steering mechanism in which the pivot steering wheel or wheels normally employed for steering are rendered free to caster when the traction wheels are operated for turning the vehicle. Thus the danger element and possible loss of control incidental to the rapid castering of the pivot steering wheel or wheels is entirely eliminated.

Another important object of my invention is to provide steering mechanism of the character described which shall be more convenient and safer to operate than those heretofore provided.

A further object is to provide a hand steering device of novel construction, including a pivot steering wheel adapted to be turned by worm and gear or the equivalent, and means for disconnecting such worm and gear at will to permit the pivot wheel to caster freely.

Still another object is to provide in a motor vehicle, foot control mechanism for steering by driving, a hand steering device, and means actuated by the foot control mechanism for rendering the hand steering device inoperative.

My invention also contemplates embodying the foregoing features in such simple and novel design as to be thoroughly practical and serviceable for the uses and purposes intended.

Other objects and attendant advantages will be appreciated by those familiar with this art as the invention becomes better understood by reference to the following description when considered in connection with the accompanying drawings, in which—

Figure 1 is a side elevation of a tractor embodying my invention;

Fig. 2, a plan view of the tractor;

Fig. 3, a fragmentary top view of the pivot steering wheel mounting and adjoining parts;

Fig. 4, a rear elevation of the parts shown in Fig. 3; and

Figs. 5 and 6, fragmentary sectional views taken substantially on the line 5—5 of Fig. 4, showing the steering worm engaged and disengaged.

My improvements may be used with any motor vehicle or other implement requiring steering mechanism, and are in no way limited to use in connection with a farm tractor, such as shown in the drawing simply for purpose of illustration. The tractor is of a type used both for ordinary tractor purposes and also for cultivating and the like. In this class of tractors, both steering and quick turning as in a small radius, is effected by differential drive of the traction wheels, the one or more pivot steering wheels being allowed to caster under the influence of such turning movement. It is desired, however, that such pivot steering wheel or wheels shall be controlled by the operator for ordinary steering; and the present invention provides for automatically rendering such steering device inoperative when the traction wheels are operated for turning the tractor. In other words, the pivot steering wheel becomes free to caster when the steering is done by the drive wheel, thus eliminating the usual grinding and wear on the hand steering mechanism and preventing any harm which might be caused by the hand steering wheel being rapidly revolved as heretofore when the tractor is turned by the driving wheels.

Referring now to the drawing, the tractor frame designated generally by character 8 is carried by a pair of traction wheels 9 and a pivot steering wheel 11. The frame carries a motor 12 which drives the traction wheels through the agency of a change speed transmission inclosed in the casing 13, and a differential driving mechanism within the casing 14, the driven elements 15 and 16 of which are connected in this instance by sprocket chains 17 to sprocket gears 18 fixed on counter-shafts 19, in turn geared to the respective driving wheels. Inasmuch as the construction of the transmission and differential is not material to the present invention, I have deemed it unnecessary to illustrate such mechanism in the drawings. The driven elements 15 and 16 of the differential mechanism are adapted to be retarded as by means of friction band brakes 21 and 22 respectively, which in turn are adapted to be tightened on the respective drums by levers 23 operated by foot levers 24 and 25. These foot levers are normally held in inoperative position by contractile springs 26. The foregoing illustrates one of various mechanisms which may be employed within the scope of the present invention for steering a motor vehicle by driving. By depressing the foot lever 24, the traction wheel at that side will be retarded to the extent desired and the opposite wheel speeded up so as to turn the vehicle to the left either slightly or completely about according to the will of the operator. By similarly operating the foot lever 25 the tractor will be turned to the right by the power steering mechanism.

The pivot wheel 11 is normally in positive driving connection with a hand steering wheel 27 located at the rear of the tractor in convenient reach of the driver's seat 28. The steering shaft 29 connects through a universal joint 31 to a shaft 32, to the forward end of which is fixed a worm 33 adapted to mesh with a worm gear 34. The shaft 35 to which the worm gear 34 is fixed is journaled in a suitable bearing braket 36 and fixed to the wheel yoke 37. It will be obvious that by turning the steering wheel 27, the wheel 11 will be turned about the axis of the shaft 35 for steering. As shown in Figs. 4 and 5, the shaft 32 is supported beyond both ends of the worm 33 in elongated bearings 38 fixed with respect to the main frame, permitting the shaft and worm to be shifted in a horizontal plane to move the worm into and out of mesh with the worm gear.

My invention contemplates the provision of suitable means controlled from the driver's seat for breaking and establishing connection between the hand wheel 27 and the pivot wheel 11, and I prefer that this result shall be obtained automatically upon operating the traction wheels for steering. To this end I have provided means operated by depression of either or both of the foot levers 24 and 25 for disengaging the worm 33. This means comprises in the present instance, a cam slide 39 having a cam slot 41 in which is disposed a bolt 42 carried by a yoke 43 supported on the shaft 32. The cam slot is so shaped that upon drawing the slide 39 rearwardly from the position shown in Fig. 5 to that shown in Fig. 6, the worm will be withdrawn from the gear. The slide is connected by a ink 44 to the free end of a lever 45 which is fulcrumed at 46 and connected intermediate its ends at 47 to both foot levers 24 and 25 through the agency of rods 48 and 49 respectively. More particularly, the rods 48 and 49 each have a one-way connection with the brake lever 23 of its respective foot lever. It follows, therefore, that upon depressing either foot lever 24 or 25, the lever 45 will be swung rearwardly and thereby disengage the worm 33. Upon releasing the foot levers, they will be returned to normal position by the springs 26 and the worm will be re-engaged by the action of the contractible spring 51 (Fig. 3). The hand levers 52 shown in the drawings, are for the purpose of changing speeds and the direction of drive.

From the foregoing, it will be manifest that the tractor in the normal position shown in Figs. 1 and 2, will be automatically guided or steered by means of the hand wheel 27. When it is desired to turn the tractor at a corner or to turn completely about as at the end of the rows when cultivating, the operator will press down on the proper foot lever, thereby locking the traction wheel at that side and causing the other wheel to turn the tractor about the fixed wheel as a pivot. By this operation of the foot control for turning the tractor, the hand steering device will be rendered inoperative by disengaging the worm 33, allowing the pivot wheel 11 to caster freely as the tractor is swung about. When steering by driving is stoppped the hand steering device is forthwith rendered operative so that the steering of the tractor immediately comes under hand control of the operator. By the use of my invention in a tractor or other vehicle the control is greatly improved and made easier and the operator has immediate control of the steering at the termination of the steering by driving. It is also possible to follow the rows with greater ease and accuracy, because it is not necessary for the operator to leave go of the steering wheel 27 while the tractor is turning and to again take hold of the wheel when it is desired to steer by means of the front pivot wheel.

It is believed that the foregoing conveys a clear understanding of my invention, and while I have illustrated and described but a single working embodiment thereof, it will be apparent that various changes might be made in the construction and arrangement without departing from the spirit and scope of the invention as expressed in the appended claims.

I claim:

1. In a motor vehicle, the combination of a foot control mechanism for steering by driving, a hand steering device, and means actuated by the foot control mechanism for rendering the hand steering device inoperative.

2. In a motor vehicle, in combination, mechanism for steering by driving, a hand steering device including a hand control member and a steering wheel operatively connected thereto so as to be turned thereby and adapted to caster when disconnected therefrom, and means for automaticallly disconnecting said steering wheel from said hand control member when said mechanism is operated for steering by driving.

3. In a motor vehicle, in combination, power-operated traction wheels, a steering wheel adapted to caster, a hand wheel operatively connected to the steering wheel for turning it by hand, a control for causing power to be applied to said traction wheels for steering, and means for automatically disconnecting the steering wheel from said hand wheel when said control is operated for steering so as to render said steering wheel free to caster.

4. In a motor vehicle, the combination of foot-controlled mechanism for steering by driving, a hand-operated steering wheel adapted to be disconnected so as to caster, and means for automaticallly disconnecting said steering wheel when said foot control is operated for steering by driving.

5. In a motor vehicle, the combination of a hand-steering device including a pivot steering wheel and a worm and gear for turning said wheel, a pair of traction wheels, power-operated mechanism for independently driving said wheels, a pair of control levers for differentiating the drive of said traction wheels, whereby to steer by driving, and means actuated by operation of either of said control levers for disconnecting said worm and gear for disabling the hand-steering device when the vehicle is steered by driving.

6. In a motor vehicle, the combination of a hand steering device including a pivot steering wheel and a worm and gear for turning said wheel, a foot lever, and means operated by said foot lever including a cam for quickly withdrawing said worm from its gear for disabling the hand-steering device.

HARRY R. TRAPHAGEN.